(12) United States Patent
Nakamura (10) Patent No.: US 6,899,096 B2
(45) Date of Patent: May 31, 2005

(54) AUTONOMOUS HELIOSTAT

(75) Inventor: Katsushige Nakamura, Tokyo (JP)

(73) Assignee: Mitaka Kohki Co., Ltd., Tokyo (JP)

( * ) Notice: Subject to any disclaimer, the term of this patent is extended or adjusted under 35 U.S.C. 154(b) by 0 days.

(21) Appl. No.: 10/753,335

(22) Filed: Jan. 9, 2004

(65) Prior Publication Data
US 2004/0231660 A1 Nov. 25, 2004

(30) Foreign Application Priority Data
May 6, 2003 (JP) .................................... 2003-128243

(51) Int. Cl.$^7$ ................................................ F24J 2/38
(52) U.S. Cl. ...................................... 126/581; 126/582
(58) Field of Search .............................. 126/569, 570, 126/572, 573, 574, 578, 581, 58; 700/59, 61; 250/548

(56) References Cited

U.S. PATENT DOCUMENTS 5,979,438 A   11/1999   Nakamura

FOREIGN PATENT DOCUMENTS

JP   2002-098415 A1   4/2002

Primary Examiner—Stephen Gravini
(74) Attorney, Agent, or Firm—Rader, Fishman & Grauer PLLC (57) ABSTRACT

An autonomous heliostat (1) having an independent autonomous control function and eliminating the need for a complicated control by a computer or the like is provided. The heliostat includes a target sensor (19) for controlling reflected light (R) from a mirror component (5) to direct it to the target sensor 19, and a search sensor (12) for catching sunlight (S) to guide reflected light from the mirror component to the target sensor, thereby to autonomously start control by the target sensor.

15 Claims, 9 Drawing Sheets

AUTONOMOUS HELIOSTAT

BACKGROUND OF THE INVENTION

1. Field of the Invention

This invention relates to autonomous heliostats capable of tracking the sun without the need for complicated control by computer, concentrating sunlight into a predetermined area.

2. Description of the Related Art

For effective utilization of solar energy, there is a known art of using a number of heliostats installed to reflect and concentrate sunlight into a predetermined area while tracking the sun. Heliostats have a mirror to rotate with the movement of the sun, with which mirror to collect sunlight into thermal conversion equipment, for example, in which the sunlight is converted into thermal energy for generating electricity. Addition of thermal energy of sunlight to coal and natural gas to produce fuel alcohol without emitting carbon dioxide has also been studied.

SUMMARY OF THE INVENTION

In such conventional heliostats, however, it is necessary to individually control rotations of mirrors of a number of installed heliostats in accordance with the movement of the sun, which requires a large computer and is unfavorable in cost. For controlling heliostats, which are often used in a field such as desert, with a large computer, provision for protecting the large computer from external factors such as heat and dust is also required, resulting in an increased cost for that purpose. In addition, under a system in which a number of heliostats are collectively controlled by a large computer, if the system goes down, all the heliostats are stopped, which is unfavorable in terms of reliability.

The present invention has been made in view of the problems in the conventional art, and relates to autonomous heliostats having respective individual autonomous control functions, eliminating the need for complicated control by a computer or the like.

According to a first technical aspect of the present invention, there is provided an autonomous heliostat comprising: a mirror component having at least one mirror, the mirror component being mounted to a heliostat body in a tiltable manner; a target sensor immovably fixed to an area other than the mirror component, the target sensor having a photodetector for detecting a displacement in a first direction of sunlight reflected by part of the mirror component and a displacement in a second direction intersecting the first direction of the reflected sunlight; a search sensor for detecting a displacement of the sunlight in a direction related to diurnal motion; and a controller for controlling the orientation of the mirror component based on the detection of the search sensor so that sunlight reflected by part of the mirror component is detectable by the target sensor, and for controlling the orientation of the mirror component so that the reflected sunlight detected by the target sensor maintains a predetermined displacement.

According to a second technical aspect of the present invention, the autonomous heliostat further comprises: a right ascension drive mounted to the heliostat body, the right ascension drive being adapted to control rotation of the mirror component in a direction related to diurnal motion of the sun; and a declination drive connected to the right ascension drive, the declination drive being adapted to control rotation of the mirror component in a direction related to seasonal motion of the sun; wherein, the right ascension drive and the declination drive drive the mirror component according to instructions from the controller.

According to a third technical aspect of the present invention, the autonomous heliostat is characterized in that: the right ascension drive comprises a first drive for applying a first torque to the mirror component, the first drive being fixed in position to the heliostat body, and a reducer connected between the first drive and the declination drive, the reducer being rotatably mounted to the heliostat body and capable of applying a second torque for precise rotation; and the controller controls the first torque for tilting the mirror component in the right ascension direction until the search sensor catches the sun, and controls the second torque for controlling the orientation of the mirror component such that the reflected sunlight maintains the predetermined displacement, or selectively controls the orientation of the mirror component in such a manner as to maintain a predetermined rotational speed corresponding to the diurnal motion of the sun.

According to a fourth technical aspect of the present invention, there is provided a method of controlling an autonomous heliostat for controlling a mirror component to reflect sunlight in a predetermined direction, the method comprising the steps of: a first operation of detecting a displacement in a direction related to a diurnal motion of sunlight to tilt the mirror component in the direction related to the diurnal motion such that sunlight reflected by the mirror component comes close to a predetermined direction; and a second operation of repeatedly detecting a displacement of the reflected sunlight from the predetermined direction to tilt the mirror component such that the reflected sunlight is directed in the predetermined direction.

According to a fifth technical aspect of the present invention, the method of controlling an autonomous heliostat is characterized in that in the second operation, when the detection of displacement of the reflected sunlight is difficult, the mirror component is tilted based on calculation of the diurnal motion of the sun.

DESCRIPTION OF THE PREFERRED EMBODIMENTS

A preferred embodiment of the present invention will be described with reference to the figures.

Figure 1:
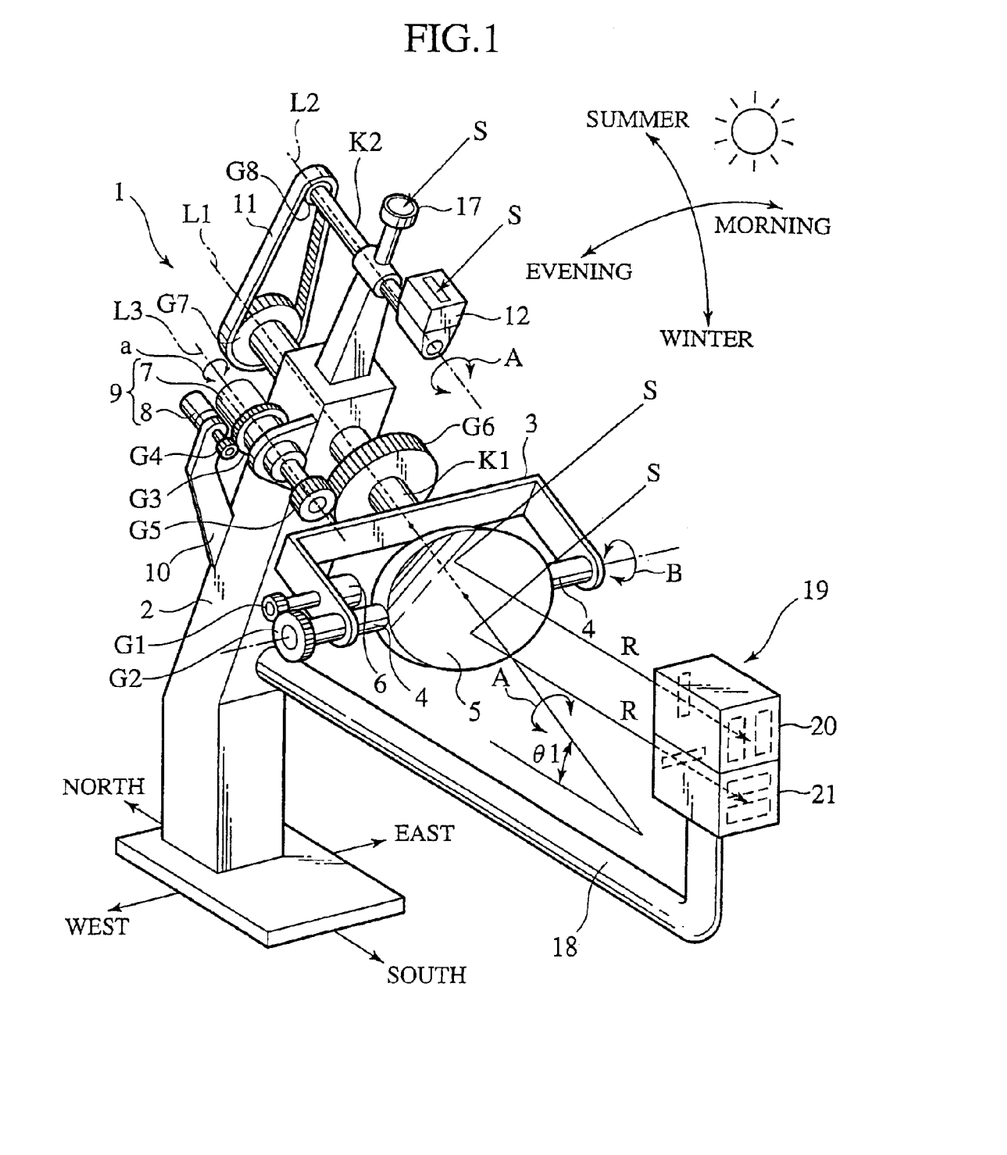
FIG. 1 is an overall perspective view of a heliostat according to a first embodiment of the present invention.

FIGS. 1 to 10 illustrate a first embodiment of this invention. FIG. 1 shows one of a plurality of heliostats 1 according to the embodiment which are installed in such a manner as to encircle thermal conversion equipment not shown. The heliostat 1 in this embodiment will be described in a case of being used in the northern hemisphere. Needless to say, the present invention is also applicable for use in the southern hemisphere or in the equatorial zone.

A support (body) 2 of the heliostat 1 is fixed on the ground. In the heliostat 1 shown in the figure, an upper portion of the support 2 is tilted south. At the upper portion of the support 2, a first polar shaft K1 being in parallel with the axis of rotation of the earth and in agreement with a first theoretical line L1 which forms a fixed angle θ1 with the ground is provided in such a manner as to be rotatable in a right ascension direction A about the first theoretical line L1, penetrating the support 2.

A U-shaped arm 3 is supported at its central portion on the south end of the first polar shaft K1. Specifically, the arm 3 is a fork member with a bifurcated distal end, actively rotatable in the right ascension direction A. Between the opposite ends of the arm 3, a mirror component 5 comprised of a single mirror is supported in such a manner as to be rotatable in a declination direction B via a declination shaft 4. The rotational axis of the declination shaft 4 is orthogonal to the first theoretical line L1.

At one end of the arm 3, a declination drive 6 having a motor and a reduction mechanism is fixed in position. A gear G1 of the declination drive 6 engages a gear G2 provided on one end of the declination shaft 4 to rotate the mirror component 5 by a torque produced by the declination drive 6 in the declination direction B. Thus the mirror component 5 is mounted to the support 2 of the heliostat 1 via the polar shaft K1 in a tiltable manner.

A right ascension drive 9 having a precision drive 7 and a quick drive 8 is provided at an upper portion of the support 2. The precision drive 7 includes a second motor and a second reduction mechanism connected to a rotor of the motor and is supported rotatably via a bearing not shown in "a" direction (see FIG. 1) about a theoretical line L3 relative to the support 2. A case of the precision drive 7 is fixed to a stator of the second motor around which a gear G3 is formed. The gear G3 engages a gear G4 of the quick drive 8. The quick drive 8 includes a first motor and a first reduction mechanism connected to a rotor of the motor. Since the quick drive 8 is position-fixed to the support 2 via a support bracket 10, rotation of the gear G4 can cause rotation of the precision drive 7 itself. The precision drive 7 can therefore apply, with the second motor, a second torque (precise rotation) to the polar shaft K1 via the gear G5 and can also apply to the polar shaft K1 a first torque (quick rotation) by the function of the "reduction mechanism" for reducing the speed of rotation produced by the quick drive 8 by its rotation for transmission to the polar shaft K1.

Since the precision drive 7 has a portion fixed to the stator of the second motor and a portion fixed to the rotor, both of which are rotatable about the theoretical line L3, power supply through normal wiring cannot be done without twisting wires. Power supply to the precision drive 7 is performed with a known rotary contact form such as a slip ring in place of normal wiring.

The number of revolutions of the gear G4 at the distal end of the quick drive 8 is about 6 to 10 times the number of revolutions of the gear G5 at the distal end of the precision drive 7. If the gear G5 at the distal end of the precision drive 7 is in an irrotational state, the precision drive 7 in its entirety is rotated by the quick drive 8, so that the gear G5 at the distal end of the precision drive 7 is rotated. If the precision drive 7 is stopped, the rotational resistance of the reduction mechanism placed between the second motor and the gear G5 in the precision drive 7 causes the gear G5 at the distal end of the precision drive 7 to rotate together with the precision drive 7 (not to idle).

The gear G5 at the distal end of the precision drive 7 engages a gear G6 on the first polar shaft K1. The second torque produced by the precision drive 7 can directly cause the gear G5 to rotate, or the first torque produced by the quick drive 8 can cause the gear G5 to rotate via the precision drive 7. As a result, the first polar shaft K1 can be rotated in the right ascension direction A together with the arm 3 and the mirror component 5. The quick drive 8, precision drive 7 and gear G6 constitute a drive mechanism for the mirror component 5 and the arm 3.

On top of the support 2, a second polar shaft K2 which is in parallel with the first theoretical line L1 and in agreement with a second theoretical line L2 is rotatably supported. The second polar shaft K2 is also rotatable in the right ascension direction A about the second line L2, and rotates in synchronization with the first polar shaft K1. Gears G7 and G8 are provided on the north ends of the first polar shaft K1 and the second polar shaft K2, respectively. A timing belt 11 runs between the gears G7 and G8. The timing belt 11 transmits a torque of the first polar shaft K1 to the second polar shaft K2, rotating the second polar shaft K2 in the same direction as the first polar shaft K1 rotates. Of the two gears G7 and G8 between which the timing belt 11 runs, the gear G8 on the second polar shaft K2 has half the number of teeth of the gear G7 on the first polar shaft K1. Thus the ratio of the number of revolutions between the first polar shaft K1 and the second polar shaft K2 is one to two.

Figure 2:
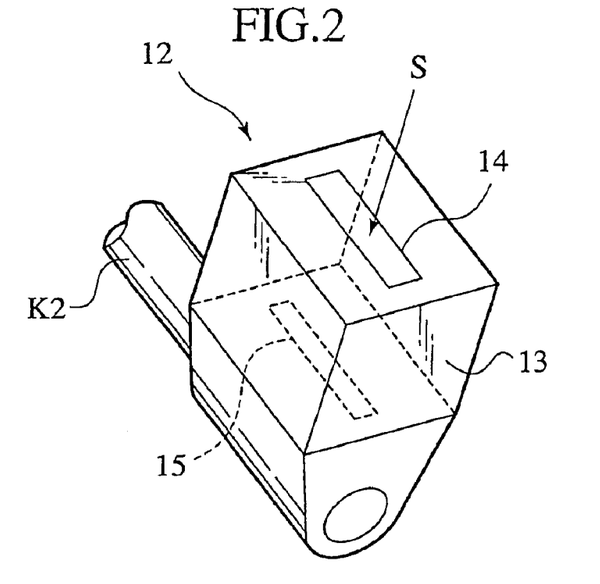
FIG. 2 is a perspective view of a search sensor.
Figure 3:
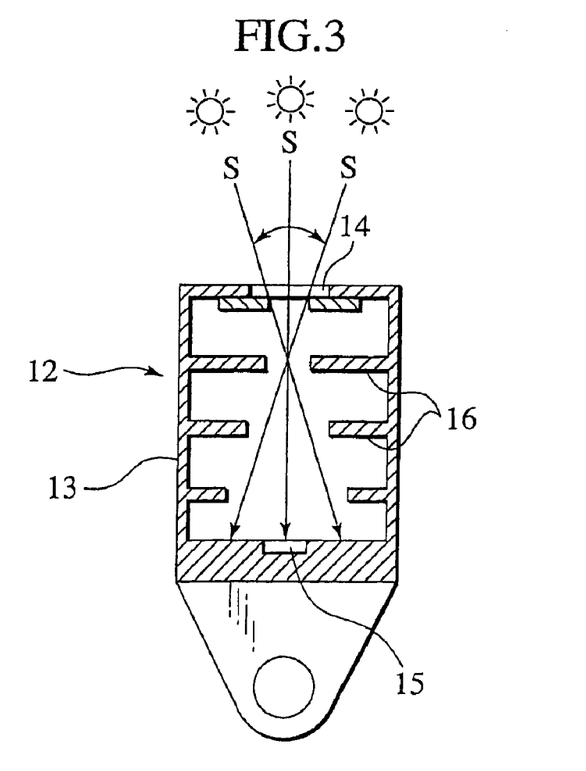
FIG. 3 is a cross-sectional view of the search sensor taken in the right ascension direction.
Figure 4:
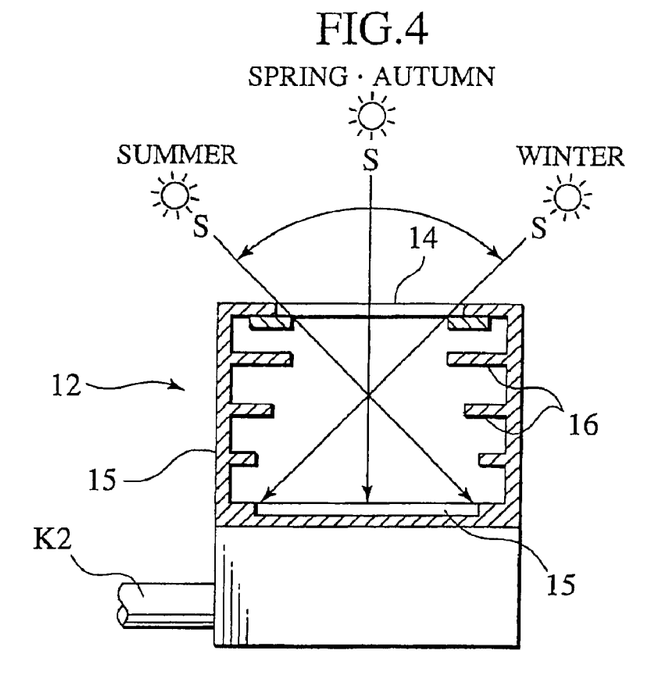
FIG. 4 is a cross-sectional view of the search sensor taken in the declination direction.

On the south end of the second polar shaft K2, a search sensor 12 for tracking the sun S is fixed (see FIG. 2). The search sensor 12 has a slit window 14 in an upper surface of a lightproof box 13. On the inside bottom of the lightproof box 13, a linear photosensor 15 is provided. On the inside surface of the lightproof box 13, a plurality of ribs 16 are formed for preventing reflection of introduced sunlight S off the inside surface, and an anti-reflective coating not shown is also provided. Therefore, as shown in FIG. 3, only sunlight S coming in through the window 14, traveling straight, and reaching the photosensor 15 is detected by the photosensor 15. The slit window 14 is configured, as shown in FIG. 4, to be able to introduce sunlight S into the photosensor 15 even if the incident altitude is varied due to seasonal motion of the sun. Specifically, the window 14 has a sufficient length in the declination direction to introduce sunlight S into the photosensor 15, accommodating seasonal motion of the sun. The window 14 is substantially equivalent to a pin hole in the right ascension direction, so that the diurnal motion of the sun can be reliably detected by the photosensor 15 in every season. When sunlight S is detected at a substantially central area of the photosensor 15 when the mirror component 5 is rotated about the right ascension shaft (polar shaft) K1, a target sensor 19 to be described below can catch reflected sunlight, precisely detecting the displacement, and allowing precise and quick orientation toward an illumination target.

On top of the support 2, a light-amount sensor 17 is provided at a topmost position. The light-amount sensor 17 measures the amount of sunlight S. When the measured amount is equal to or lower than a predetermined value, the sensor 17 outputs the information in the form of a signal.

In the heliostat 1 shown, the target sensor 19 is provided at a predetermined height on the distal end of a rod 18 extending south from the support 2. The target sensor 19 is for detecting reflected light R to orient sunlight R reflected by the mirror component 5 toward an illumination target P. The target sensor 19 introduces part of reflected sunlight R thereinto, thereby detecting the direction of the reflected sunlight R. The target sensor 19 is not necessarily in a direction completely agreeing with that of the illumination target P of the heliostat 1. It is only required to fix the target sensor 19 in position relative to the heliostat body (support). That is, the target sensor 19 can be positioned offset at a certain angle from the direction of the illumination target P, thereby avoiding partially interrupting the reflected light to enable efficient transmission of the reflected light to the illumination target P. Instead of being fixed to the support 2, the target sensor 19 may alternatively be fixed to the ground or to the illumination target P as long as reflected light R can be directed toward the illumination target P. In other words, the target sensor 19 is fixed in a position relative to the illumination target P of the heliostat 1. In the claims, the target sensor 19 is described as being immovably fixed to an area other than a mirror component. In this embodiment, the mirror component 5 is described as being comprised of a single mirror. It is also possible to fix another mirror (not shown) to the mirror component 5 exclusively for directing light reflected off the mirror to the target sensor 19.

Figure 5:
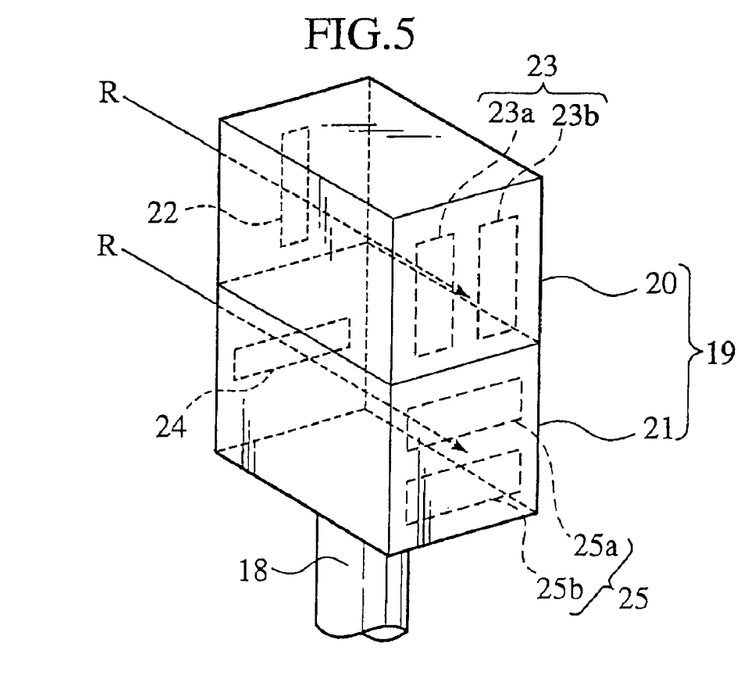
FIG. 5 is a perspective view of a target sensor.

The target sensor 19 includes a right ascension sensor 20 mainly for detecting the movement of sunlight R in the right ascension direction A and a declination sensor 21 mainly for detecting the movement of sunlight R in the declination direction B (see FIG. 5). The right ascension sensor 20 is formed with a slit window 22 in a direction intersecting the right ascension direction A (in the vertical direction in FIG. 5), and a dual element photosensor 25 is provided on its inside bottom surface and split into two parts opposite to one another in a direction corresponding to the right ascension direction A (horizontal direction in FIG. 5). The right ascension sensor 20 is enclosed by a lightproof box like the search sensor 12 and is provided on its inside with similar ribs and an anti-reflective coating. The declination sensor 21 basically has the same structure as that of the right ascension sensor 20 except that the orientation of a window 24 and a photosensor 25 differs 90 degrees from that in the right ascension sensor 20. Specifically, the declination sensor 21 is formed with the slit window 24 in the direction intersecting the declination direction B (horizontal direction in FIG. 5) and has the photosensor 25 provided on its inside bottom surface and split into two parts opposite to one another in a direction corresponding to the declination direction B (vertical direction in FIG. 5). The photosensors 23 and 25 in the target sensor 19 are neutral when light introduced through the windows 22 and 24 strikes the dual element photosensors 23 and 25 by the same amount. Deviations from neutral points in direction and amount are outputted outside in the form of control signals.

Figure 6:
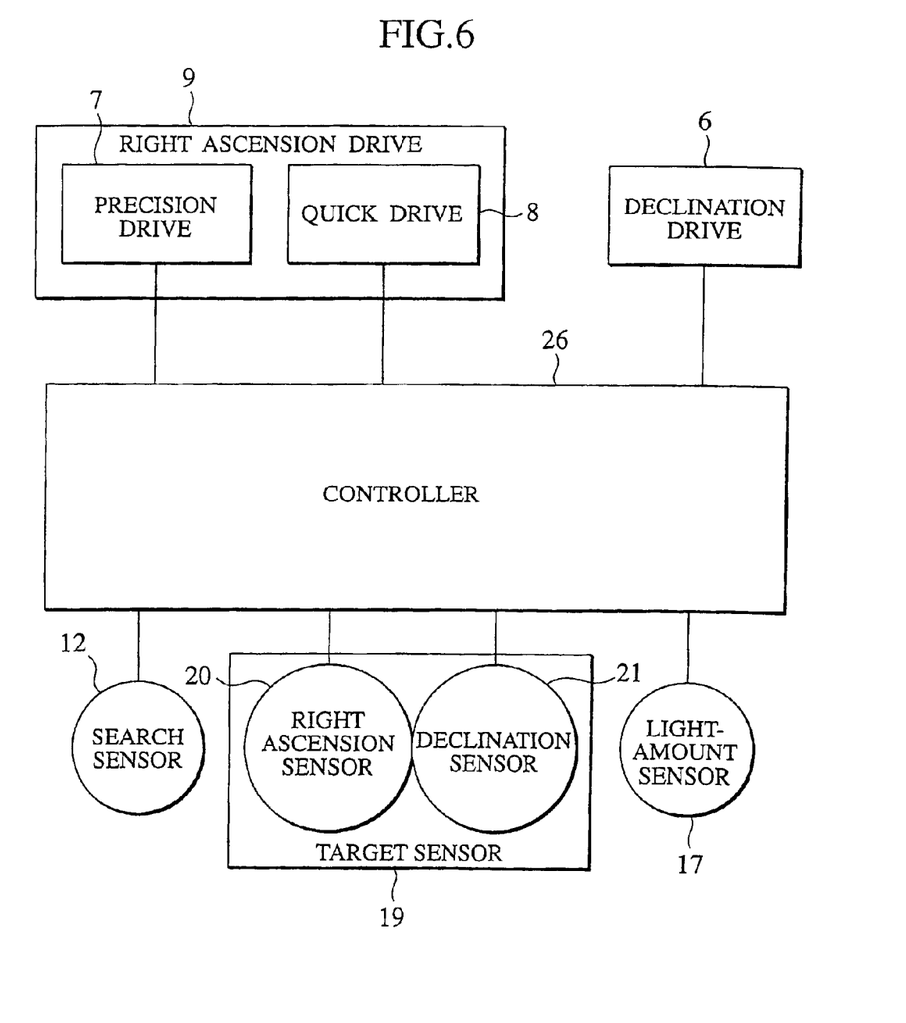
FIG. 6 is a block diagram illustrating control of the heliostat.

As shown in FIG. 6, the target sensor 19, search sensor 12, light-amount sensor 17, right ascension drive 9 and declination drive 6 are individually connected to a controller 26. Based on signals from the target sensor 19, search sensor 12 and light-amount sensor 17, the right ascension drive 9 and declination drive 6 are controlled. The control will be described below in the description of operation.

Figure 7:
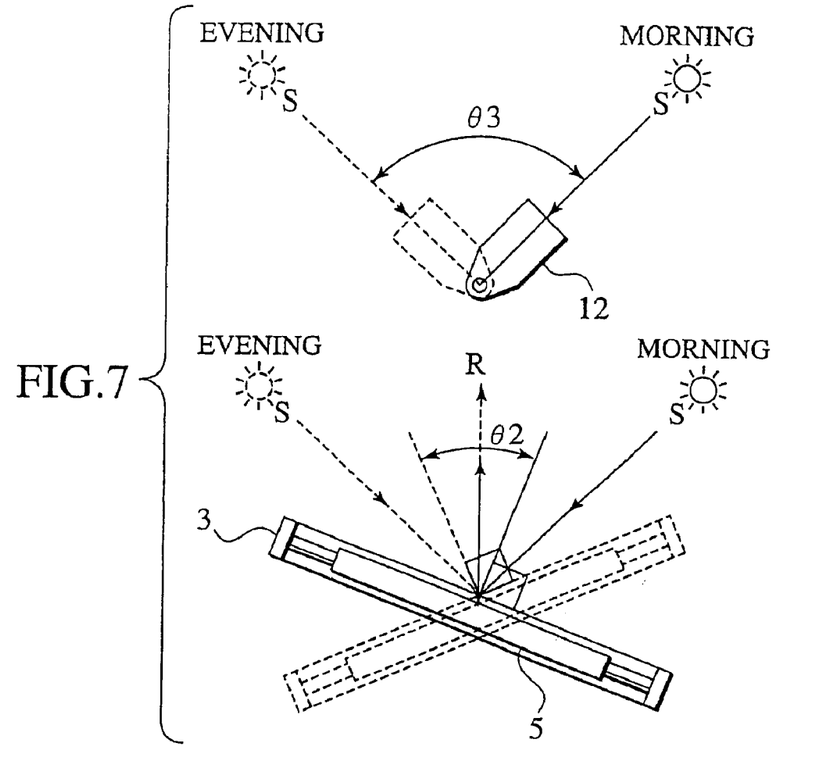
FIG. 7 is a diagram illustrating angles of rotation of the search sensor and a mirror component in the right ascension direction.

As shown in FIG. 7, angles of rotation of the search sensor 12 and the mirror component 5 in the right ascension direction A have the relationship of substantially two to one on the principal of the optical lever, as described above. For convenience of description, FIG. 7 shows that sunlight S is reflected off the surface of the mirror component 5 at one point, and an angular variation of the normal line on the point constitutes a rotation angle θ2 of the mirror component 5, which is one-half the rotation angle θ3 of the search sensor 12 (that is, the angle of diurnal motion of the sun).

In a first stage of setting the orientation of the search sensor 12 and the mirror component 5, once the orientation of the mirror component 5 is set such that sunlight reflected by the mirror component 5 is directed to the target sensor 19 in the right ascension direction A when the search sensor 12 catches the sun in the right ascension direction A, that relationship will be maintained irrespective of the position of the sun. That is, regardless of in what manner the search sensor 12 and the mirror component 5 are rotated in conjunction with one another, when the search sensor 12 catches the sun, reflected light R reflected by the mirror component 5 can always be made in agreement with the target sensor 19 in the right ascension direction A.

Figure 8:
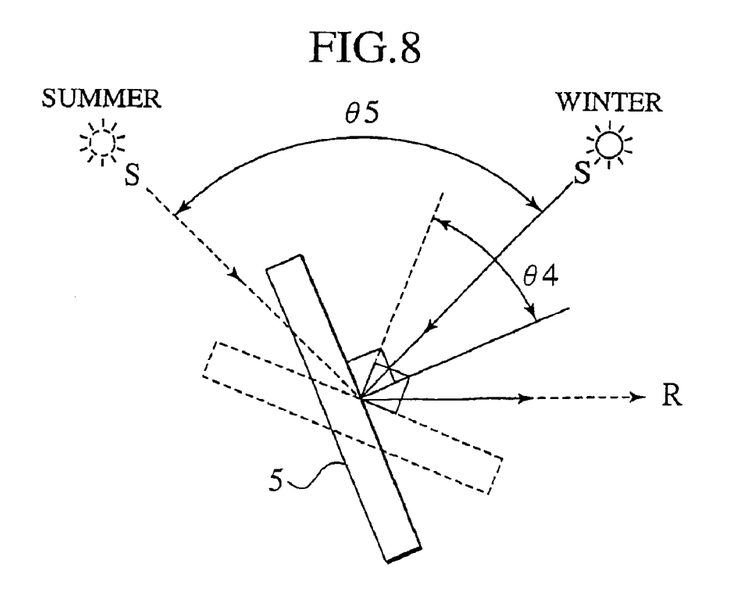
FIG. 8 is a diagram illustrating an angle of rotation of the mirror component in the declination direction.

Also, as shown in FIG. 8, the rotation angle 04 of the mirror component 5 in the declination direction B is half the rotation angle 05 of the sun in the declination direction B on the principle of the optical lever, which will not be described here, to avoid redundancy of description.

Figure 9:
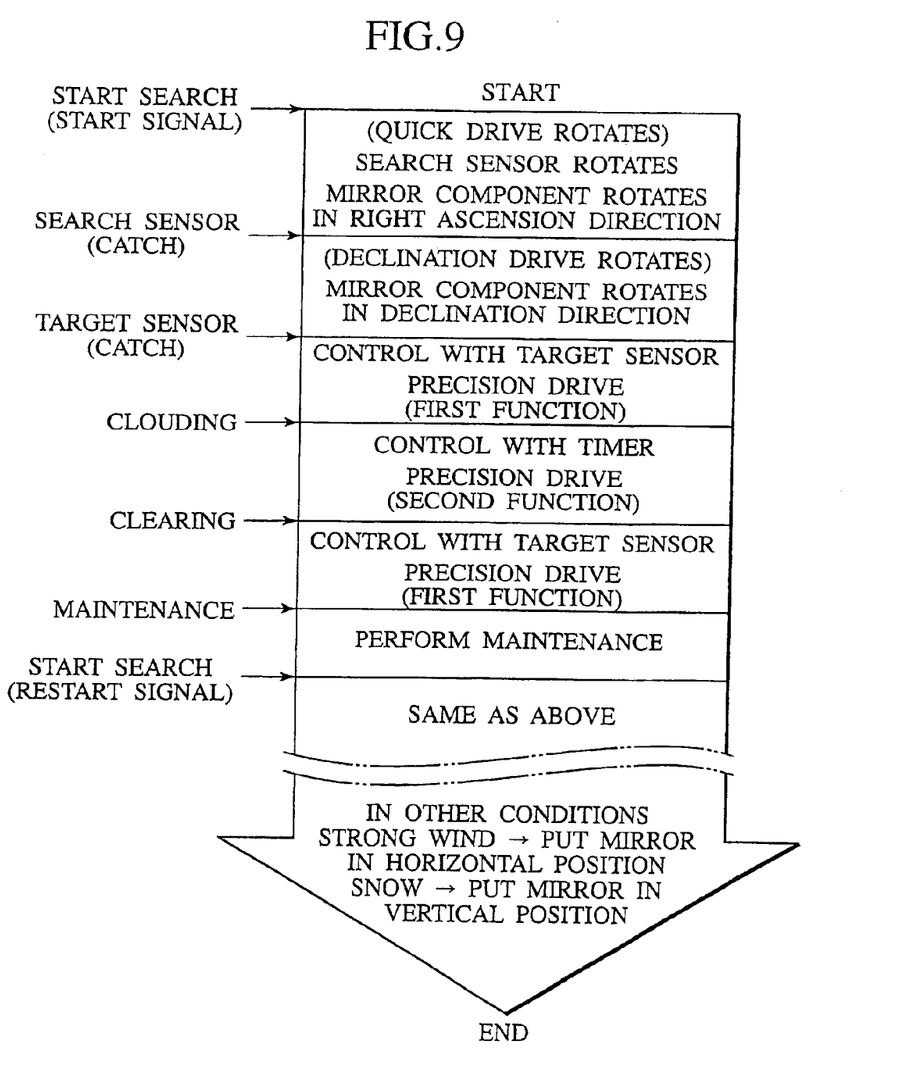
FIG. 9 is a flowchart illustrating operation in the first embodiment.

Now, with reference to FIG. 9, the operation of the autonomous heliostat 1 in this embodiment will be described. Description will be made on the assumption that, before starting the heliostat 1, the mirror component 5 faces a direction with no relation to the target sensor 19 in the right ascension direction A, and reflected light R reflected by the mirror component 5 is not directed to the target sensor 19.

A start signal is transmitted to the heliostat 1 by hand or a timer. Upon the transmission of the start signal, first, the quick drive 8 operates, and the gear G6 engaging the gear G5 rotates the first polar shaft K1 via the precision drive 7. As already described, the gear G5 of the precision drive 7 is not rotated by the second motor within the precision drive 7 but is rotated through the rotation of the precise drive 7 by the quick drive 8. That is, since the second reduction mechanism of the precision drive 7 has a large rotational resistance, the second motor is not rotated. The precision drive 7 rotates integrally with the quick drive 8.

When the first polar shaft K1 rotates, the mirror component 5 and the search sensor 12 interlocked therewith both rotate in the right ascension direction A. The search sensor 12 is, in this embodiment, rotated over a range to cover all the diurnal motion of the sun. During rotation, the search sensor 12 reaches the position at which it can capture sunlight S. In that position, sunlight S coming in through the window 14 of the search sensor 12 strikes the inside photosensor 15. When a single photosensor element is used for the photosensor 15, the position is where the maximum intensity of light received is detected. The search sensor 12 has the lightproof box 13 to allow only sunlight S passing through the window 14 to be introduced into the photosensor 15, blocking off external stray light, and reliably detecting sunlight S with the photosensor 15.

Figure 10:
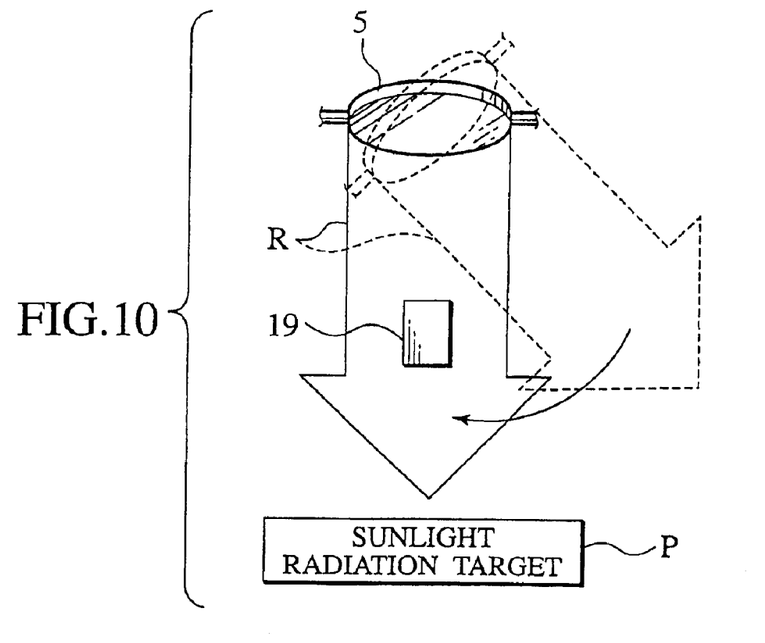
FIG. 10 is a plan view illustrating rotation of the mirror component in the right ascension direction for introducing reflected light into the target sensor.

The search sensor 12 stops the rotation of the mirror component 5 in the sun-catching position. As described above, with the search sensor 12 catching sunlight S, the previous setting allows part of reflected light R reflected off the mirror component 5 to be in agreement with the target sensor 19 in the right ascension direction A. If reflected light R from the mirror component 5 is first directed to a point away from the target sensor 19 as shown in FIG. 10, the reflected light R is in the vicinity of the target sensor 19 because the reflected light R is into agreement with the target sensor 19 in the right ascension direction A. Rotation of the mirror component 5 based on the search sensor 12 can be quickly done by the quick drive 8, so that reflected light R from the mirror component 5 can be brought in agreement with the target sensor 19 in the right ascension direction A in a short period of time.

Then, the declination drive 6 is operated to rotate the mirror component 5 in the declination direction B. Since the search sensor 12 has already brought reflected light R from the mirror component 5 into agreement with the target sensor 19 in the right ascension direction A, the reflected light R reaches a position in which it is in agreement with the target sensor 19 in the declination direction B while the declination drive 6 rotates the mirror component 5 in the declination direction B. That is, the mirror component 5 is rotated in the declination direction B until the declination sensor 21 detects reflected light. As a result, reflected light R from the mirror component 5 is made both in the right ascension direction A and in the declination direction B in agreement with and completely directed to the target sensor 19.

When the reflected light R is directed to the target sensor 19, the photosensors 23 and 25 of the right ascension sensor 20 and the declination sensor 21 in the target sensor 19 receive the light, allowing control of the mirror component 5 by the target sensor 19. In this case, if at least one of the photosensor elements 23a and 23b and at least one of the photosensor elements 25a and 25b detect the reflected light R, the photosensors 23 and 25 are in a light-receiving state. The right ascension sensor 23 and the declination sensor 21 detect the optical center of the reflected light R, respectively, and quantitatively calculate deviation in direction and an amount of the reflected light R in the right ascension direction A and the declination direction B, and precisely control the mirror component 5 for correction. In the case where reflected light strikes near a neutral point of the dual element photosensor 23, for example, different outputs of light-receiving signals from the two photosensor elements 23a and 23b of the two-part-split photosensor 23 allows a high-sensitive detection of the displacement of the reflected light. The same is true for the dual element photosensor 25. As a result, once the reflected light R is directed to the target sensor 19, the state is maintained even if the sun moves. The reflected light R can be continuously applied to the illumination target (such as thermal conversion equipment) P (see FIG. 10) of the sunlight S, which is placed ahead of the target sensor 19.

At the time when control by the target sensor 19 is started, the function of the search sensor 12 as a guide for guiding reflected light R from the mirror component 5 to the target sensor 19 is completed. The function of the search sensor 12 is stopped to switch to control only by the target sensor 19.

Under control by the target sensor 19, both the precision drive 7 and the declination drive 6 are controlled by the target sensor 19 for precise rotation. The precision drive 7 and the declination drive 6 can rotate at a higher speed than a speed controlled by the target sensor 19. During tracking control of reflected light R by the target sensor 19, rotation angles are precisely controlled in accordance with the diurnal motion and seasonal motion of the sun. The precise rotation of the precision drive 7 controlled on the basis of detection information from the target sensor 19 is referred to as a "first function."

The precision drive 7 has a "second function" independent of control by the target sensor 19. In the case where a required amount of sunlight S for control by the target sensor 19 cannot be obtained due to generation of cloud or the like during control by the target sensor 19, the light-amount sensor 17 detects that state and switches the precision drive 7 to the "second function."

In the second function, the mirror component 5 is automatically rotated at a predetermined speed corresponding to the diurnal motion of the sun, based on a timer (equatorial control). If sunlight S is blocked out by cloud or the like, the mirror component 5 is directionally controlled based on calculation of the diurnal motion of the sun, so that the mirror component 5 can be automatically continuously rotated as if controlled by the target sensor 19. As a result, when the sky clears and sunlight S can again be tracked by the target sensor 19, reflected light is in the vicinity of the neutral point of the target sensor 19, allowing immediate return to the first function.

Even under control by the target sensor 19, the heliostat 1 in this embodiment can stop its operation when necessary for maintenance or the like. When maintenance or the like is completed, a restart signal is transmitted to cause the search sensor 12 to again locate the sun to introduce reflected light R from the mirror component 5 into the target sensor 19, easily restarting control by the target sensor 19 in the same manner as described above.

As described above, according to the first embodiment, the mirror component 5 can be directionally controlled with the search sensor 12 to cause reflected light R from the mirror component 5 to be in agreement with the target sensor 19 at least in the right ascension direction A in which the sun mainly moves. With combined movement of the mirror component 5 in the declination direction B in which the sun moves a little, reflected light R from the mirror component 5 can be easily guided to the target sensor 19 so as to immediately start control by the target sensor 19. Without a large computer for overall control, each heliostat 1 uses the guiding function of the search sensor 12 to automatically start control by the target sensor 19, being favorable in cost. Each heliostat 1 has an independent autonomous control system. If some of the installed heliostats 1 fail, the other heliostats 1 are not affected and can continue light-collecting operation, resulting in improved reliability.

Second Embodiment

Figure 11:
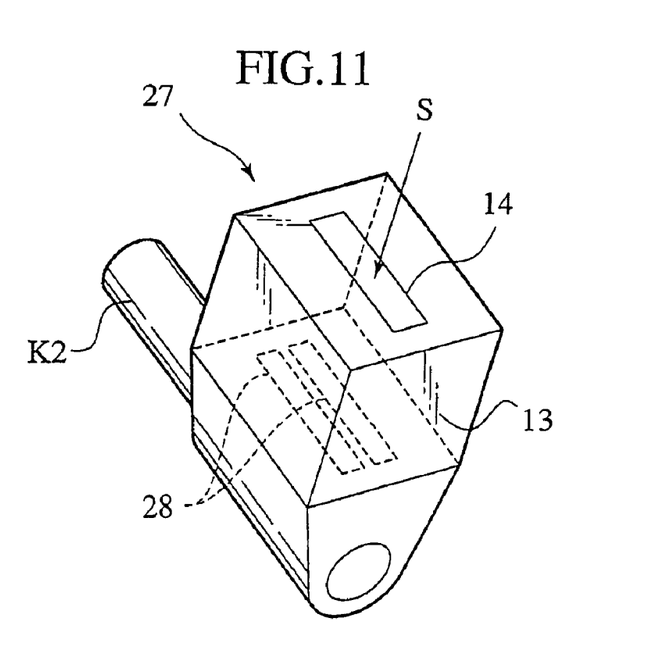
FIG. 11 is a perspective view of a search sensor according to a second embodiment of the present invention.

FIG. 11 illustrates a second embodiment of this invention. In the second embodiment, a photosensor 28 in a search sensor 27 has a two-part split configuration. The two-part split configuration like the target sensor 19 allows a single photosensor to detect sunlight S by combining signals from two photosensor elements. Detection of a neutral point in which the two elements of the photosensor 28 receive an equal amount of light allows precise detection of the optical center of incident sunlight S, allowing the search sensor 27 to perform more precise detection.

Third Embodiment

Figure 12:
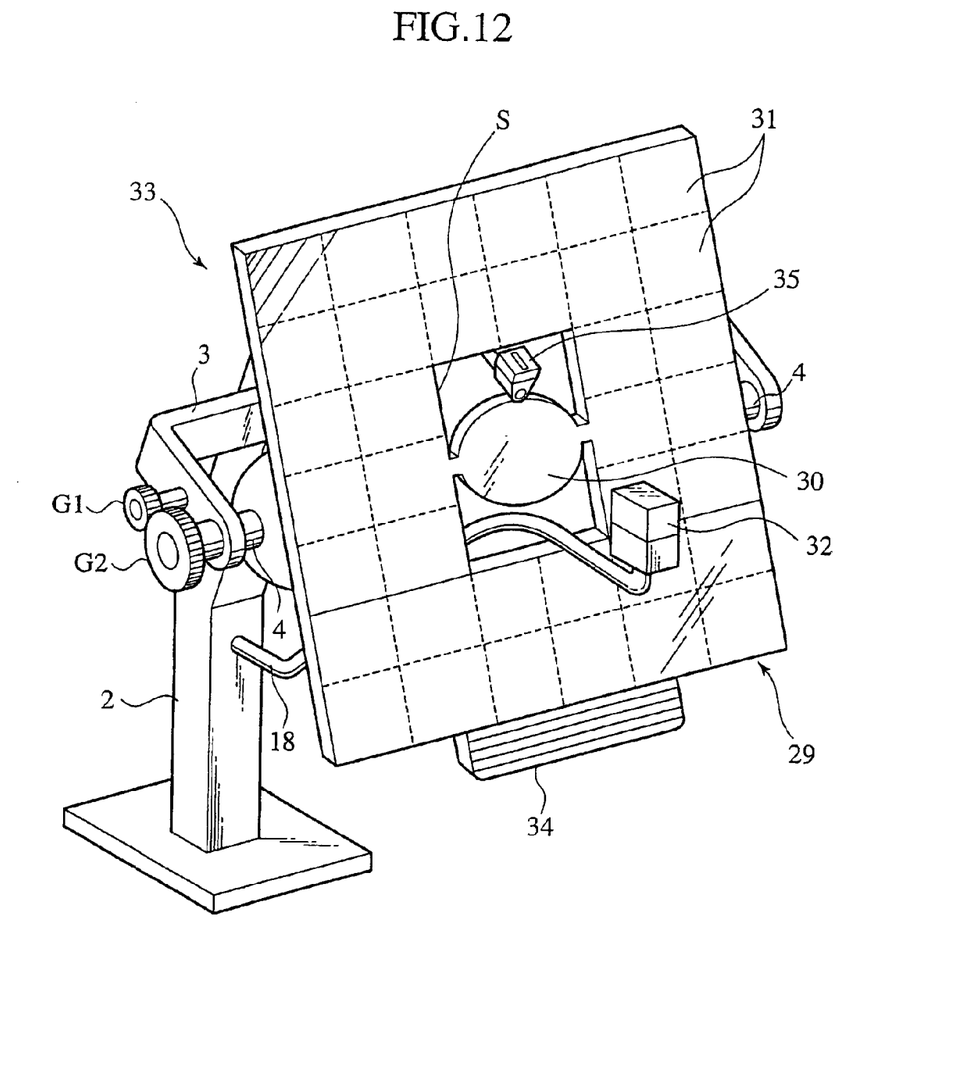
FIG. 12 is a perspective view of a heliostat according to a third embodiment of the present invention.

FIG. 12 illustrates a third embodiment of this invention. In the third embodiment, a mirror component 29 consists of a plurality of mirrors 30 and 31. Specifically, the mirror component 29 is formed with a circular mirror 30 for transmitting reflected light to a target sensor 32 and a plurality of square mirrors 31 around the circular mirror 30. To the bottom of the mirror component 29 is attached a solar panel 34 capable of supplying required power to a heliostat 33. A search sensor 35 and the target sensor 32 are put out through the gap between the circular mirror 30 and the surrounding mirrors 31. The structure of supporting the mirror component 29 rotatably in a right ascension direction and a declination direction is basically the same as in the first embodiment. That is, the mirror component 5 in the first embodiment is divided into the mirror 30 for the target sensor 32 and the mirrors 31 for illumination. Components identical with those in the first embodiment are given the same reference numerals and will not be described redundantly. The target sensor 32 is not necessarily disposed in a line connecting the mirror component 29 to an illumination target P as long as reflected light coming into the target sensor 32 is introduced into a central portion of a split sensor when reflected light of sunlight illuminates the illumination target P in an optimum manner.

According to the third embodiment, a larger amount of sunlight can be reflected. Making the mirror component 29 in its entirety in a concave shape or making the mirrors 31 concave mirrors for convergence allows for more efficient light collection. Power required for rotation of the mirror component 29 and sensor control can be supplied by the solar panel 34. When there is a sufficient amount of sunlight, power required for operation of the heliostat 33 itself can all be supplied by the solar panel 34. Equipment for distributing electricity to the heliostats 33 can be simplified or eliminated, resulting in a further reduction in cost.

Fourth Embodiment

Figure 13:
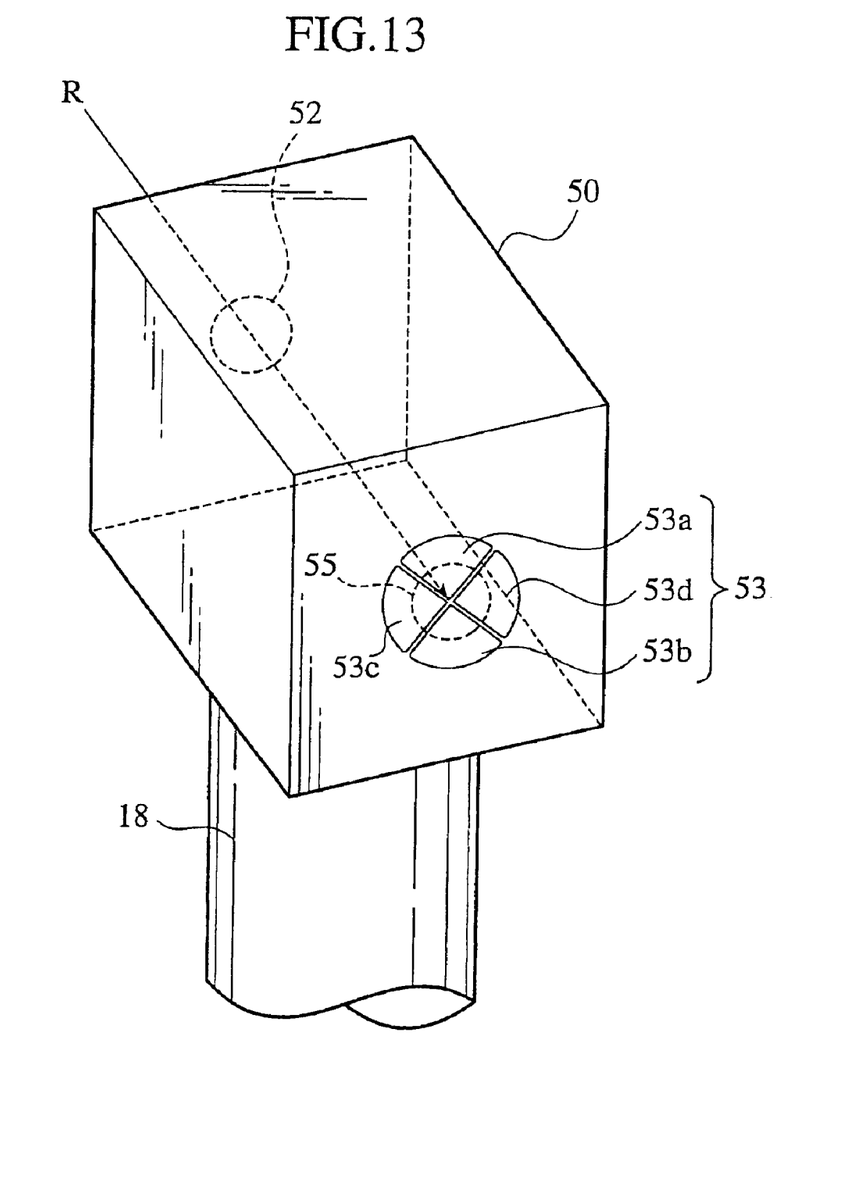
FIG. 13 is a perspective view of a target sensor employing a quadrant element photosensor according to a fourth embodiment of the present invention.

In the above description, a target sensor consists of a pair of two-part split photosensors for detecting the movement of sunlight R in cross directions. It is also possible to constitute a target sensor 50 using a quadrant element photosensor 53 as a single four-part split photosensor as shown in FIG. 13.

The target sensor 50, like the target sensor 19 in FIG. 5, detects reflected light so as to direct reflected light R reflected by the mirror component 5 to an illumination target P. The target sensor 50 introduces part of the reflected light R thereinto to detect the direction of the reflected light R. The target sensor 50 is formed with a single opening window 52 for receiving reflected light and is provided on its inside bottom surface with a photosensor 53 having four independent photosensor elements 53a to 53d. The photosensor 53 is, like the search sensor 12, enclosed by a lightproof box which is provided with similar ribs and an anti-reflective coating. The photosensor 53 of the target sensor 50 in this embodiment can operate as a right ascension sensor as well as a declination sensor as in FIG. 5 as will be described below.

Detection signals from the photosensor elements 53a, 53b, 53c and 53d of the photosensor 53 are amplified by a preamplifier not shown. The four photosensor elements 53a to 53d can serve as a single photosensor by combining four output signals therefrom so as to detect the presence or absence of reflected light. For operating the photosensor 53 as a declination sensor, the photosensor elements 53c and 53d are used as a two-part split photosensor as described above. For operating the photosensor 53 as a right ascension sensor, the photosensor elements 53a and 53c are used as a dual element photosensor as described above. Use of the quadrant element photosensor 53 allows detection of a two-dimensional displacement of the introduced reflected light R from a neutral area 55.

Since detection signals from the elements 53a to 53d of the quadrant element photosensor 53 are individually amplified for calculation, the target sensor 50 in this embodiment can be used both as a right ascension sensor and as a declination sensor, and can be simultaneously used as a right ascension sensor and a declination sensor.

In the above embodiments, the target sensor 19, 32 or 50 is fixed to the support 2. The target sensor 19, 32 or 50 may alternatively be fixed to the ground or on other area as described above. As long as the target sensor 19, 32 or 50 is fixed in position relative to the mirror component 5 or 29, it may be fixed in any manner. The support 2 is tilted at its upper portion in the embodiments, but may be configured straight with the first polar shaft K1 and the second polar shaft K2 tilted thereto. It is also possible to use the photosensor 23, 25 or 53 of the target sensor 19, 32 or 50 as a light-amount sensor without providing the light-amount sensor 17 so as to automatically switch the precision drive 7 to the second function when sufficient reflected light R does not reach the photosensor 23, 25 or 53 during control by the target sensor 19, 32 or 50.

Effects of the Invention

According to the present invention, with combined movement of the mirror component in a direction related to little seasonal motion of the sun, reflected light from the mirror component can be easily guided to the target sensor so as to immediately start control by the target sensor. Without a large computer for overall control, each heliostat can automatically start control by the target sensor, using the guiding function of the search sensor, being favorable in cost. Each heliostat has an independent autonomous control system. If some of installed heliostats fail, the other heliostats are not affected and can continue the light-collecting operation, resulting in improved reliability.

The mirror component is rotatable both in the right ascension direction for the diurnal motion of the sun and in the declination direction for the seasonal motion of the sun. During control by the search sensor for making reflected light from the mirror component in agreement with the target sensor at least in the right ascension direction, it is only necessary to rotate the mirror component in the right ascension direction, facilitating the control. In order to control the mirror component in the direction associated with the diurnal motion of the sun by an altazimuth system, the mirror component must be controlled in rotation both in the azimuth (horizontal) direction and in the altitude (vertical) direction, resulting in very troublesome control. The structure described in the specification only requires rotation in the right ascension direction, facilitating the control.

The rotation angle of the mirror component is one-half the rotation angle of the search sensor rotating for capturing the sun, so that reflected light from the mirror component can be continuously and constantly reflected in the same direction in the right ascension direction. The one-half angle is the ratio for the mirror component to reflect sunlight in the plane perpendicular to the mirror component. When the reflection direction of sunlight is deviated (warped) outside the plane, depending on the position of the target sensor with respect to the sunlight, the ratio of one-half is slightly changed. Therefore the definition "ratio of substantially one to two" is made in this invention. Under the "ratio of substantially one to two," in the first stage of setting the orientation of the search sensor and the mirror component, once the mirror component is directionally set in such a manner as to be in agreement with the target sensor in the right ascension direction when the search sensor captures the sun in the right ascension direction, that relationship can be maintained. With the search sensor capturing the sun, reflected light is always in agreement with the target sensor in the right ascension direction. With combined rotation of the mirror component in the declination direction, reflected light is always directed to the target sensor and is received by the target sensor for starting control. At the start of control by the target sensor, the function of the search sensor as a guide for guiding reflected light from the mirror component to the target sensor is completed. The function of the search sensor is stopped to switch to control only by the target sensor.

Until the search sensor catches the sun, the mirror component and the interlocked search sensor are rotated by the quick drive at a high speed, so that reflected light from the mirror component can be introduced into the target sensor in a short period of time to promptly start rotation control by the target sensor. At the start of control by the target sensor, the precision drive performs the first function to precisely control the mirror component in conformity with the movement of the sun based on a control signal from the target sensor. When necessary, the precise drive is switched to the second function to automatically control the mirror component at a predetermined speed corresponding to the diurnal motion of the sun (equatorial control).

When the amount of sunlight is reduced, rotation control of the precision drive is automatically switched to the second function. If sunlight is blocked out by cloud or the like during rotation control by the target sensor, the mirror component can automatically continue rotating as if controlled by the target sensor. When sunlight comes back, the precision drive can return to the first function with the mirror component continuously rotating.

The search sensor or the target sensor has the photosensor enclosed by the lightproof box formed with the window. Only sunlight passing through the window is allowed to be introduced into the photosensor. External stray light can be blocked off to allow the photosensor to reliably detect sunlight.

The two-part split or four-part split configuration of the photosensor allows detection of a neutral point in which two separate photosensors receive an equal amount of light for more precise detection.

The window of the lightproof box has a length which allows sunlight of the sun located at all the different positions during the seasonal motion to be introduced into the photosensor, allowing the search sensor to be fixed only in a certain state without being configured to rotate in the direction of the seasonal motion.

Further, according to the present invention, power required for rotation of the mirror component and the sensor control can be supplied by the solar panel. When a sufficient amount of sunlight is obtained, all the power required for the operation of the heliostat itself can be supplied by the solar panel. Equipment for distributing electricity to heliostats can be simplified or eliminated, resulting in a cost reduction in that respect.

Although the invention has been described above by reference to certain embodiments of the invention, the invention is not limited to the embodiments described above. Modifications and variations of the embodiments described above will occur to those skilled in the art, in light of the teachings. This application claims benefit of priority under 35USC §119 to Japanese Patent Applications No. 2003-128243, filed on May 6, 2003, the entire contents of which are incorporated by reference herein. The scope of the invention is defined with reference to the following claims.

What is claimed is:

1. An autonomous heliostat comprising:
   a mirror component having at least one mirror, the mirror component being mounted to a heliostat body in a tiltable manner;
   a target sensor immovably fixed to an area other than the mirror component, the target sensor having a photodetector for detecting a displacement in a first direction of sunlight reflected by part of the mirror component and a displacement in a second direction intersecting the first direction of the reflected sunlight;
   a search sensor for detecting a displacement of the sunlight in a direction related to diurnal motion; and
   a controller for controlling the orientation of the mirror component based on the detection of the search sensor so that sunlight reflected by part of the mirror component is detectable by the target sensor, and for controlling the orientation of the mirror component so that the reflected sunlight detected by the target sensor maintains a predetermined displacement.

2. An autonomous heliostat of claim 1, further comprising:
   a right ascension drive mounted to the heliostat body, the right ascension drive being adapted to control rotation of the mirror component in a direction related to diurnal motion of the sun; and
   a declination drive connected to the right ascension drive, the declination drive being adapted to control rotation of the mirror component in a direction related to seasonal motion of the sun; wherein,
   the right ascension drive and the declination drive drive the mirror component according to instructions from the controller.

3. An autonomous heliostat of claim 2, wherein the search sensor rotates in conjunction with the rotation of the mirror component in the direction related to the diurnal motion of the sun, the search sensor being rotatable at a ratio of one-half of the rotation of the mirror component.

4. An autonomous heliostat of claim 3, wherein:
   the mirror component is rotatable about a polar axis in a right ascension direction related to the diurnal motion of the sun;
   the search sensor is rotatable about an axis parallel to the polar axis in conjunction with the mirror component; and
   the search sensor and the mirror component are previously set such so when the search sensor catches the sun in the right ascension direction, sunlight reflected by the mirror component is in agreement with the target sensor in the right ascension direction.

5. An autonomous heliostat of claim 4, wherein:
   the controller controls, by a predetermined start signal or restart signal, rotation of the mirror component such that the search sensor is rotatable to an orientation which catches the sun in the right ascension direction and the mirror component is rotatable to an orientation which is in agreement with the target sensor in the declination direction; and
   the function of the search sensor is stopped when the mirror component is oriented in agreement with the target sensor in the right ascension direction and the declination direction and reflected light from the mirror component is directed to the target sensor, allowing the target sensor to control the mirror component.

6. An autonomous heliostat of claim 5, wherein:
   the right ascension drive comprises a first drive for applying a first torque to the mirror component, the first drive being fixed in position to the heliostat body, and a reducer connected between the first drive and the declination drive, the reducer being rotatably mounted to the heliostat body and capable of applying a second torque for precise rotation; and the controller controls the first torque for tilting the mirror component in the right ascension direction until the search sensor catches the sun, and controls the second torque for controlling the orientation of the mirror component such that the reflected sunlight maintains the predetermined displacement, or selectively controls the orientation of the mirror component in such a manner as to maintain a predetermined rotational speed corresponding to the diurnal motion of the sun.

7. An autonomous heliostat of claim 6, further comprising a light-amount sensor for measuring the amount of sunlight, wherein, when the light amount is reduced to a degree with which the target sensor has difficulty in control, the orientation of the mirror component is controlled in such a manner as to maintain the predetermined rotational speed.

8. An autonomous heliostat of claim 1, wherein the search sensor includes a lightproof box formed with a window for introducing sunlight, and a photosensor provided in the lightproof box for detecting the sunlight.

9. An autonomous heliostat of claim 8, wherein the photosensor has a two-part split configuration, the two parts thereof being opposite to one another in a direction corresponding to the diurnal motion of sunlight.

10. An autonomous heliostat of claim 8, wherein the window of the lightproof box has a shape allowing introduction of sunlight into the photosensor, accommodating the seasonal motion of the sun.

11. An autonomous heliostat of claim 1, wherein:

the target sensor includes a first photodetector for detecting a displacement in the first direction and a second photodetector for detecting a displacement in the second direction;

the first photodetector comprising a lightproof box formed with a first window for introducing sunlight, and, within the lightproof box, a two-part split first photosensor, the two parts thereof being opposite to one another in the first direction for detecting the sunlight;

the second photodetector comprising a lightproof box formed with a first window for introducing sunlight, and, within the lightproof box, a two-part split second photosensor, the two parts thereof being opposite to one another in the second direction for detecting the sunlight.

12. An autonomous heliostat of claim 1, wherein:

the target sensor comprises a lightproof box formed with a window for introducing sunlight and, in the lightproof box, a four-part split photosensor, the four parts thereof being arranged in parallel in the first direction and in the second direction for detecting the sunlight.

13. An autonomous heliostat of claim 1, further comprising a solar panel capable of supplying power required for controlling the mirror component.

14. A method of controlling an autonomous heliostat for controlling a mirror component to reflect sunlight in a predetermined direction, the method comprising the steps of:

a first operation of detecting a displacement in a direction related to a diurnal motion of sunlight to tilt the mirror component in the direction related to the diurnal motion so that sunlight reflected by the mirror component comes close to a predetermined direction; and a second operation of repeatedly detecting a displacement of the reflected sunlight from the predetermined direction to tilt the mirror component so that the reflected sunlight is directed in the predetermined direction.

15. A method of controlling an autonomous heliostat of claim 14, wherein in the second operation, when the detection of displacement of the reflected sunlight is difficult, the mirror component is tilted based on calculation of the diurnal motion of the sun.

* * * * *